Figure 3:
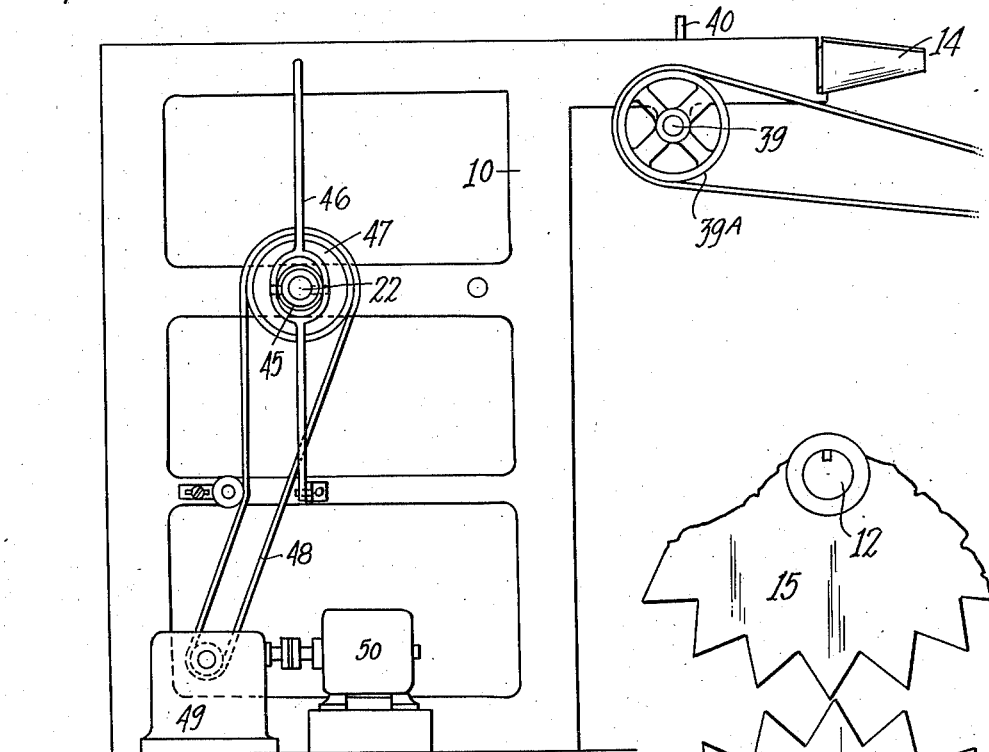

Feb. 21, 1939.  M. BROFF  2,148,148
CONE MOLDING MACHINE
Filed Dec. 3, 1937  2 Sheets-Sheet 1
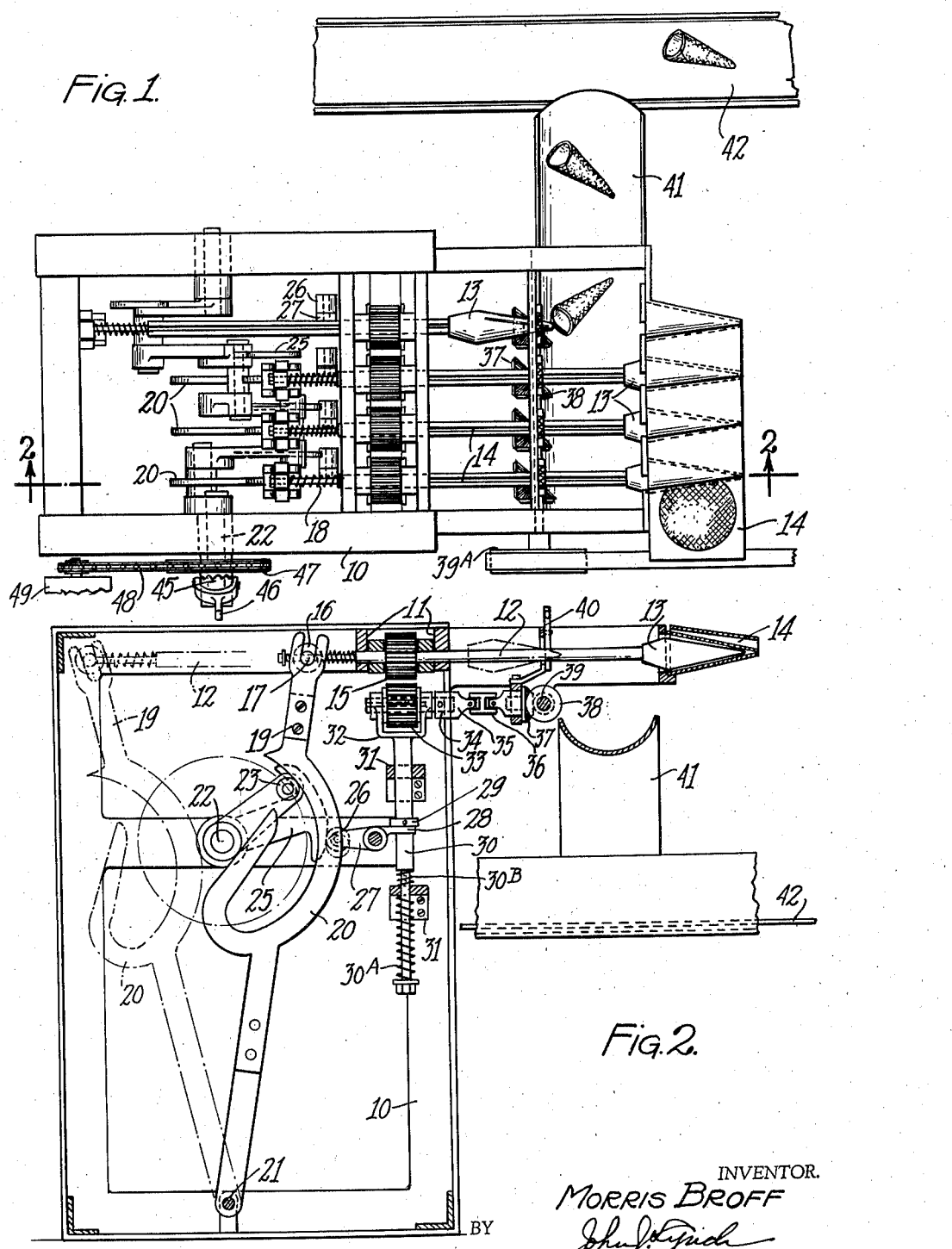
INVENTOR.
MORRIS BROFF
ATTORNEY.

Patented Feb. 21, 1939

2,148,148

UNITED STATES PATENT OFFICE 2,148,148

CONE MOLDING MACHINE

Morris Broff, Brooklyn, N. Y.

Application December 3, 1937, Serial No. 177,858

4 Claims. (Cl. 107—58)

This invention relates to ice cream cone rolling machines and in particular to a type in which a plurality of mandrels turn a flat cone cake into cone form and seal the same closed.

In machines of this character, as shown in Patent Number 1,576,011 the belt driving means that causes rotation of the mandrels in their proper sequence is unsatisfactory for several reasons. The most objectionable reason being the slippage of the belt in its gripping effort which throws the timing of the parts out of proper sequence and gradually changes the length of rotary motion so that the cones are incompletely rolled and sealed and are wasted. A still further object of the invention is to provide a positive driving means which can be momentarily engaged with the rolling mandrels so that they will revolve a definite number of times to complete the shaping of the cone and can be positively disengaged so that sealing of the cone is quickly and efficiently carried out.

A further object of the invention is to provide a construction which is more silent in operation than the belt driving means heretofore employed, provides means whereby a cushioning effect is obtained so that less wear occurs in the machine parts and the machine thereby has a longer life, and further provides means whereby a pluraltiy of driving means from various sources is provided so that the parts of the mechanism can be properly synchronized to adapt the cone rolling machine with other machines used in conjunction therewith such as a baking machine which first bakes the cone cake and discharges it onto the rolling machine in moist condition so that it can be cone-shaped about the revolving mandrels quickly and efficiently and sealed closed and subsequently discharged from the machine as a finished product.

With these and other objects in view, my invention comprises the construction, combination and arrangement of parts as hereinafter described and then particularly pointed out in the claims.

In the drawings:

Figure 1 is a plan view of a cone rolling machine showing the general arrangement of the parts and the operation of the device in rolling and discharging the finished cones.

Figure 4:
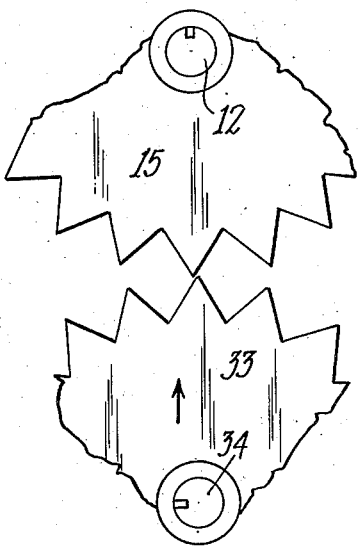
Figure 5:
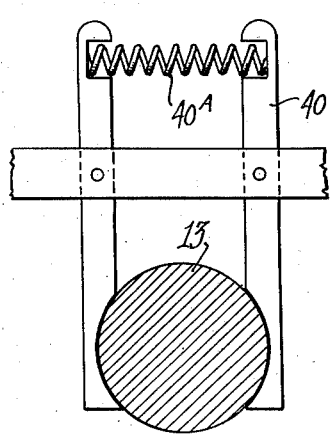

Figure 2 is a view in side elevation of the machine illustrated in Figure 1 and showing the gear elevating means that causes positive operation of the rolling mandrels, Figure 3 is a view of the exterior of the outside of the machine showing the driving means employed to operate the mandrels in rotation and separate driving means for operating the mandrels in synchronism with each other, Figure 4 is an enlarged fragmentary view of the gear teeth used for positive engagement of the gears of the mandrel driving means, and Figure 5 is a sectional view taken through one of the mandrels and showing the means for forcing the finished cone off the mandrel.

Referring to the drawings in detail, 10 indicates the frame of a cone rolling machine in which are disposed the cross pieces 11 in which are mounted for sliding movement the spindles 12 supporting the cone forming mandrels 13 at the ends thereof. The mandrels are arranged for projection into and out of the cone forming pockets of a shaping plate 14 suitably mounted at the front of the machine or at one end thereof. The spindle 12 has splined thereto a gear 15, referred to as the spindle gear. As the construction of all the spindles, mandrels and associated parts are substantially alike a description of one unit will suffice. The gear 15 is disposed between the cross peices 11 and due to its splined connection with the spindle permits the latter to have longitudinal as well as rotary motion. The rotary motion is imparted by the operation of the spindle gear 15 while the lengthwise adjustment of the spindle is accomplished by the cam arm 19 in whose upper yoked end the trunnions 17 of the slide piece 16 are journalled. The slide piece is mounted on the reduced end of the spindle and cushioned between suitable springs as well understood. The cam arm 19 is pivoted in the bottom of the frame 10 of the machine and in its mid-portion is shaped to provide a cam part 20 in which operates a roller 23 carried on a suitable eccentric offset from an eccentric shaft 22. This shaft has a roller for each cam for each spindle and in addition carries a cam arm 25 whose cam end constitutes means for raising the gear that operates the spindle gear 15.

In the operation of the machine, the spindle is projected into the cone plate 14 and simultaneously with its entrance thereto, it is revolved to shape into cone formation a cake that has been fed onto the plate 14. This revolving motion must begin at a definite time and end very abruptly so that the dwell of the mandrel will seal the dough of the cake and thus close the cone. A certain number of revolutions of the mandrel are necessary to shape the cone and the rotation of the mandrel must begin as soon as said mandrel enters the cone plate. It is necessary therefore to have a positive drive mechanism and one that will instantly mesh and unmesh from the gears 15 that rotate the spindles 12. To this end, I provide a roller 26 in the end of a lever arm 27 in such position that said roller will be engaged by the cam 25 to raise the forked end 28 of said lever arm 27 and hold it raised against a collar 29 fixed to the elevator shaft 30 suitably mounted for sliding vertical movement in the cross members 31, supported in the frame 10. A spring 30B serves as a cushion for the elevator in its dropping movement while the spring 30A has a tendency to draw the elevator downwardly to keep the companion gear 33 journalled in the yoked end 32 of the elevator out of mesh with gear 15 unless the gear 33 is forced into mesh and sustained in contact with gear 15 by the cam 25. As the roller 23 travels along part of cam 20, the cam 25 operates to keep the gear 33 in mesh with gear 15 and after the cam 25 releases the roller 26, the spring 30A unmeshes gears 33 and 15, the continued movement of the cam roller 23 holding the mandrel in stationary position in the plate 14 to provide a sealing dwell, after which the arm 19 is operated to retract the spindle so that the mandrel passes through the wiper 40 which sweeps the cone off the mandrel into a suitable chute from which it drops onto a conveyor 42, the chute being indicated by the numeral 41. The wiper comprises the arms 40 suitably pivoted to a part of the machine frame and engaging the opposite sides of the mandrel under the mild urging of the spring 40A positioned between the arms 40.

The gear 33 is splined to a stud shaft 34 which can slide in the yoke 32 and to which is secured the member 35 constituting a universal joint 36 so that, as the elevator raises, continued drive of the gear is possible through the medium of the bevel pinion 37 which is secured to the opposite end of the universal joint 36. The gear end of the joint may be suitably journalled in part of the machine frame so that the bevel pinion 37 is in engagement with bevel gear 38 mounted on the auxiliary drive shaft 39 journalled in opposite sides of the machine. It is understood that an elevator and its associated parts including the bevel gears 37 and 38 is provided for each spindle. The gears 38 are mounted on the shaft 39 which is driven by the belt operated pulley 39A from any outside power source. The shaft 22 is operated by the sprocket 47 whose chain 48 through the differential 49 is operated by the motor 50. Control of operation of the shaft 22 is obtained through the clutch 45 and its control lever 46. The teeth of the gears 15 and 33 are pointed as shown in Figure 4 so that a positive mesh is obtained and slippage as in the use of belts is eliminated so that the exact rotary movement of the spindles is controlled as well as the dwell time of the mandrels so that the machine operates at highest efficiency and with a minimum of spoilage of the cakes. The mandrels are cone shaped and the cone plate constitutes a mold. The crank levers formed as part of the shaft 22 are continuously driven to affect timed reciprocation of the spindles. The operation of each mandrel and spindle is in proper sequence in accordance with continuous operation of the machine.

My invention is not to be restricted to the precise details of construction shown since various changes and alterations may be made therein without departing from the scope of the invention or sacrificing the advantages derived from its use.

What I claim is:

1. In a cone rolling machine, in combination, a plurality of horizontally aligned spindles, a cone shaping mandrel on each spindle, a stationary cone plate into which each mandrel is thrust and held to shape a moist cone cake wrapped thereabout, spindle gears for revolving each spindle, a companion gear for rotating each spindle gear means for moving the companion gears, to mesh the same with said spindle gears to rotate the latter momentarily, and means for yieldably resisting the movement of said companion gears.

2. In a cone molding machine, in combination, a spindle having a mandrel thereon, a mold, means for moving the mandrel into and out of the mold including an eccentric and an arm operated thereby, a gear on the spindle for rotating the latter, a driving gear, means for continuously operating the driving gear, means for moving the drive gear to mesh and unmesh the spindle gear and a universal joint connecting said drive gear and the drive means to compensate for the movement of said drive gear in meshing and unmeshing action.

3. In a cone molding machine, in combination a spindle having a mandrel, a mold, means for moving the mandrel into the mold including an eccentric and an arm operated thereby, a gear on the spindle, a continuously operating drive gear, an elevator in which the drive gear is mounted, and means for moving the elevator to mesh the drive gear with the spindle gear for operation of the latter, and means for yieldably resisting the movement of the elevator to mesh the drive gear with said spindle gear.

4. In a cone molding machine, in combination, a plurality of spindles having mandrels, a mold plate, means for moving the mandrels longitudinally into the molds, a gear on each spindle, a plurality of continuously driven gears one for each spindle gear, means for intermittently raising and lowering the driven gears for engagement and disengagement with the spindle gears, means for actuating said driven gears, and a universal joint between said actuating means and said driven gears.

MORRIS BROFF.